United States Patent
Cheng et al.

(10) Patent No.: US 12,079,418 B2
(45) Date of Patent: Sep. 3, 2024

(54) ELECTRONIC DEVICE ENHANCING STABILITY AND TOUCH SENSING EFFECTS

(71) Applicant: E Ink Holdings Inc., Hsinchu (TW)

(72) Inventors: Te-Lung Cheng, Hsinchu (TW); Yun-Nan Hsieh, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 10 days.

(21) Appl. No.: 18/303,554

(22) Filed: Apr. 19, 2023

(65) Prior Publication Data

US 2024/0256076 A1 Aug. 1, 2024

(30) Foreign Application Priority Data

Jan. 30, 2023 (TW) ................................. 112102963

(51) Int. Cl.
*G06F 3/0354* (2013.01)
*G06F 3/041* (2006.01)
*G06F 3/044* (2006.01)

(52) U.S. Cl.
CPC ........ *G06F 3/04164* (2019.05); *G06F 3/0445* (2019.05); *G06F 3/0446* (2019.05); *G06F 2203/04107* (2013.01)

(58) Field of Classification Search
CPC .. G06F 3/04164; G06F 3/0445; G06F 3/0446; G06F 2203/04107
See application file for complete search history.

(56) References Cited

U.S. PATENT DOCUMENTS

| | | | |
|---|---|---|---|
| 7,920,129 B2 | 4/2011 | Hotelling et al. | |
| 9,529,479 B2 | 12/2016 | Liu | |
| 10,152,181 B2 | 12/2018 | Shih et al. | |
| 10,444,880 B2 | 10/2019 | Naganuma | |
| 11,068,118 B2 | 7/2021 | Rosenberg et al. | |
| 2011/0175846 A1 | 7/2011 | Wang et al. | |
| 2020/0089343 A1* | 3/2020 | Kadowaki | G06F 3/0442 |

FOREIGN PATENT DOCUMENTS

| | | |
|---|---|---|
| CN | 103744568 | 4/2014 |
| TW | M515149 | 1/2016 |
| TW | 201610796 | 3/2016 |

* cited by examiner

*Primary Examiner* — Deeprose Subedi
(74) *Attorney, Agent, or Firm* — JCIPRNET

(57) ABSTRACT

An electronic device is provided. A touch panel of the electronic device includes a substrate, a plurality of sensing electrodes, a plurality of driving electrodes, a plurality of first routings, a plurality of second routings, and a non-transparent conductive layer. The sensing electrodes are disposed on a first surface of the substrate. The driving electrodes are disposed on a second surface of the substrate. The first routings are coupled to the sensing electrodes and disposed in a first peripheral region on the first surface. The second routings are coupled to the driving electrodes and disposed in a second peripheral region on the second surface. The non-transparent conductive layer is disposed in the second peripheral region. A projection range of the non-transparent conductive layer in the first surface covers the first routings.

22 Claims, 8 Drawing Sheets

ELECTRONIC DEVICE ENHANCING STABILITY AND TOUCH SENSING EFFECTS

CROSS-REFERENCE TO RELATED APPLICATION

This application claims the priority benefit of Taiwan application serial no. 112102963, filed on Jan. 30, 2023. The entirety of the above-mentioned patent application is hereby incorporated by reference herein and made a part of this specification.

BACKGROUND

Technical Field

The disclosure relates to an electronic device; more particularly, the disclosure relates to an electronic device that includes a touch panel.

Description of Related Art

In an electronic device with a touch function, a touch circuit may be disposed on a single-sided Indium tin oxide (ITO) or a double-sided ITO (i.e., a double-sided touch panel). Generally, a portion of the touch circuit may be disposed on a top layer and a bottom layer of the double-sided touch panel, respectively, and therefore the double-sided touch panel is conducive to reduction of an area occupied by routings. However, the portion of the touch circuit is easily subject to other circuit elements in the electronic device (e.g., a display panel), whereby the touch circuit may receive a significant amount of noise. As such, stability of signal processing and touch effects may be compromised.

SUMMARY

The disclosure provides an electronic device capable of reducing noise sensed by the electronic device, so as to enhance stability and touch sensing effects of the electronic device.

According to an embodiment of the disclosure, an electronic device including a touch panel is provided. The touch panel includes a substrate, a plurality of sensing electrodes, a plurality of driving electrodes, a plurality of first routings, a plurality of second routings, and a non-transparent conductive layer. The sensing electrodes are disposed in a first active region on a first surface of the substrate. The driving electrodes are disposed in a second active region on a second surface of the substrate. The first surface is opposite to the second surface. The first routings are coupled to the sensing electrodes and disposed in a first peripheral region on the first surface. The second routings are coupled to the driving electrodes and disposed in a second peripheral region on the second surface. The non-transparent conductive layer is disposed in the second peripheral region on the second surface. A projection range of the non-transparent conductive layer in the first surface covers the first routings.

In view of the above, the electronic device provided in one or more embodiments of the disclosure is able to block signal interference of other circuit elements (e.g., the display panel) on the first routings through the non-transparent conductive layer disposed opposite to the first routings, thereby reducing noises. Therefore, the touch panel may perform operations according to signals respectively transmitted by the routings, whereby the stability and the touch effect of the electronic device may be improved when the electronic device performs a touch function.

In order to make the above-mentioned features and advantages of the disclosure comprehensible, embodiments accompanied with drawings are described in detail below.

BRIEF DESCRIPTION OF THE DRAWINGS

The accompanying drawings, which are included to provide a further understanding of the disclosure, are incorporated in and constitute a part of this specification. The drawings illustrate embodiments of the disclosure and, together with the description, serve to explain the principles of the disclosure.

DESCRIPTION OF THE EMBODIMENTS

Figure 1:
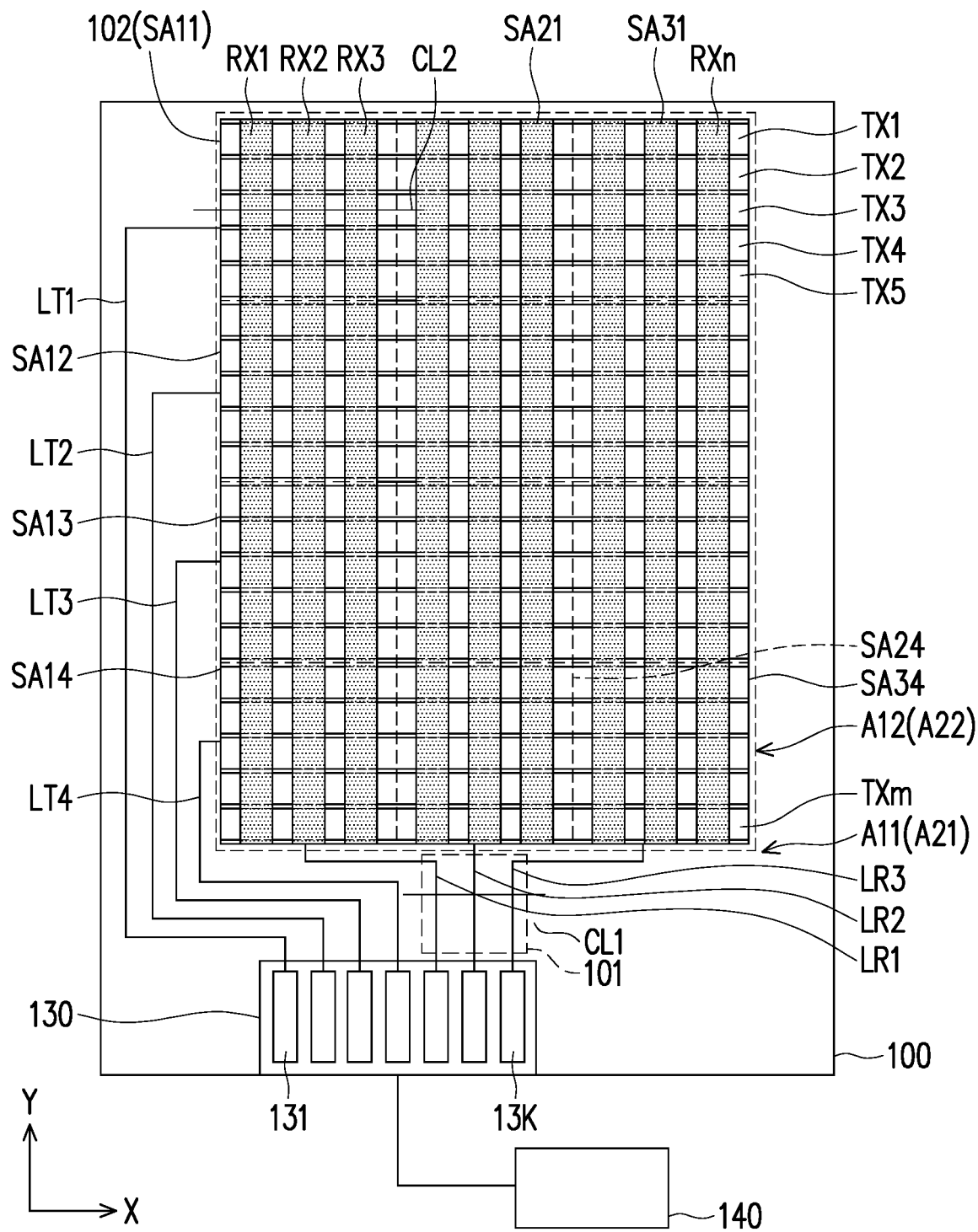
FIG. 1 is a schematic view illustrating an electronic device according to an embodiment of the disclosure.

Reference will now be made in detail to the exemplary embodiments of the disclosure, and examples of the exemplary embodiments are illustrated in the accompanying drawings. Whenever possible, the same reference numbers marking the corresponding elements/components/steps are used in the drawings and descriptions to indicate the same or similar parts.

Figure 2A:
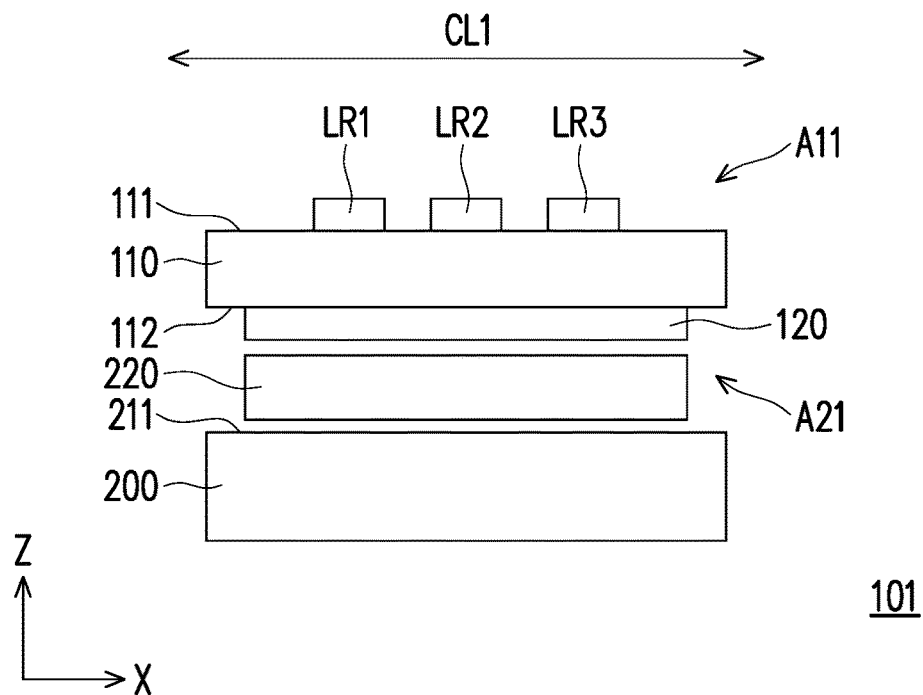
FIG. 2A is a schematic partial cross-sectional view illustrating the electronic device according to the embodiment depicted in FIG. 1.

FIG. 1 is a schematic view illustrating an electronic device according to an embodiment of the disclosure. With reference to FIG. 1, an electronic device 10 includes a touch panel 100. The touch panel 100 may be, for instance, a projected capacitive touch panel. FIG. 2A is a schematic partial cross-sectional view illustrating the electronic device according to the embodiment depicted in FIG. 1. FIG. 2A exemplarily illustrates a partial structure 101 of the electronic device 10 taken along a line segment CL1 as a cross-sectional line in a peripheral region A11 (A21).

In this embodiment, as shown in FIG. 2A, the electronic device 10 further includes a display panel 200. In a Z direction, the touch panel 100 and the display panel 200 are disposed opposite to each other. The touch panel 100 and the display panel 200 may be overlapped with each other through a bonding layer 220. The bonding layer 220 may be, for instance, an adhesion layer or any other functional layer. That is, the display panel 200 is disposed below the touch panel 100 in the Z direction. A display surface 211 of the display panel 200 faces the bonding layer 220 and a second surface 112 of the touch panel 100. The display panel 200 may be, for instance, a liquid crystal display (LCD), a light emitting diode (LED), an organic light emitting diode (OLED), an electronic paper display (EPD), or any other display panel which provides a display function.

In this embodiment, the touch panel 100 includes a substrate 110, a plurality of sensing electrodes RX1-RXn, a plurality of driving electrodes TX1-TXm, a plurality of first routings LR1-LR3, a plurality of second routings LT1-LT4, a non-transparent conductive layer connector 130, and a controller 140, where m and n are positive integers which are greater than 1, respectively. The respective quantities of the sensing electrodes RX1-RXn, the driving electrodes TX1-TXm, the first routings LR1-LR3, and the second routings LT1-LT4 in this embodiment are merely exemplary.

In this embodiment, the substrate 110 includes a first surface 111 and the second surface 112. In the Z direction, the first surface 111 is opposite to the second surface 112. On a plane defined by X and Y directions (hereinafter referred to as an X-Y plane), the first surface 111 includes the first peripheral region A11 and a first active region A12, and the second surface 112 includes the second peripheral region A21 and a second active region A22. On the X-Y plane, the first peripheral region A11 surrounds the first active region A12, and the second peripheral region A21 surrounds the second active region A22. In the Z direction, the first peripheral region A11 is opposite to the second peripheral region A21, and the first active region A12 is opposite to the second active region A22.

In this embodiment, the sensing electrodes RX1-RXn and the driving electrodes TX1-TXm are respectively disposed on different surfaces 111 and 112 of the substrate 110. In detail, the sensing electrodes RX1-RXn are respectively disposed in the first active region A12 on the first surface 111. The driving electrodes TX1-TXm are respectively disposed in the second active region A22 on the second surface 112. The sensing electrodes RX1-RXn and the driving electrodes TX1-TXm may be, for instance, indium tin oxide (ITO) electrodes or other transparent conductive materials, respectively.

In this embodiment, the sensing electrodes RX1-RXn and the driving electrodes TX1-TXm respectively extend in different directions, so as to form a plurality of strip-shaped or wave-shaped electrodes. Specifically, the sensing electrodes RX1-RXn respectively extend in the Y direction. The driving electrodes TX1-TXm respectively extend in the X direction. That is, as shown on the X-Y plane of FIG. 1, a projection range of the driving electrodes TX1-TXm on the first surface 111 and the sensing electrodes RX1-RXn are alternately arranged, and a projection range of the sensing electrodes RX1-RXn on the second surface 112 and the driving electrodes TX1-TXm are alternately arranged.

In this embodiment, the first routings LR1-LR3 and the second routings LT1-LT4 are disposed on different surfaces 111 and 112 of the substrate 110 respectively. Particularly, the first routings LR1-LR3 are respectively disposed in the first peripheral region A11 on the first surface 111. The first routings LR1-LR3 are coupled to the sensing electrodes RX1-RXn and the connector 130, so as to transmit corresponding sensing signals and/or control signals. The second routings LT1-LT4 are respectively disposed in the second peripheral region A21 on the second surface 112. The second routings LT1-LT4 are coupled to the driving electrodes TX1-TXm and the connector 130, so as to transmit corresponding driving signals and/or control signals.

Following the above description, as shown in the X-Y plane of FIG. 1, the first routings LR1-LR3 and the second routings LT1-LT4 are not overlapped. That is, a projection range of the first routings LR1-LR3 on the second surface 112 and the second routings LT1-LT4 are not overlapped, and a projection range of second routings LT1-LT4 on the first surface 111 and the first routings LR1-LR3 are not overlapped. The first routings LR1-LR3 and the second routings LT1-LT4 may be, for instance, metal conductive wires, respectively.

In this embodiment, the connector 130 is disposed in the substrate 110 and/or on the surfaces 111 and 112 of the substrate 110. The connector 130 includes a plurality of metal bonding pads 131-13$k$, where $k$ is a positive integer which is greater than 1. The quantity of the metal bonding pads 131-13$k$ in this embodiment is merely exemplary. The metal bonding pads 131-13$k$ are respectively coupled to the sensing electrodes RX1-RXn and the driving electrodes TX1-TXm through the first routings LR1-LR3 and the second routings LT1-LT4. The metal bonding pads 131-13$k$ are further coupled to the controller 140. The connector 130 may be, for instance, a flexible printed circuit board (FPC).

In this embodiment, the controller 140 is disposed in the substrate 110 and/or on the surfaces 111 and 112 of the substrate 110. The controller 140 includes a plurality of circuits (e.g., a sensing circuit 341 and a driving circuit 342 in FIG. 4) to respectively control the sensing electrodes RX1-RXn and the driving electrodes TX1-TXm. The controller 140 may be, for instance, a signal converter, a field programmable gate array (FPGA), a central processing unit (CPU), or any other programmable general-purpose or special-purpose microprocessor, digital signal processor (DSP), programmable controller, application specific integrated circuits (ASIC), programmable logic device (PLD), any other similar devices, or a combinations of these devices, and the controller 140 is able to load and execute computer program-related firmware or software to achieve a control function, a touch point reporting function, and so on.

In this embodiment, as shown in FIG. 2A, the non-transparent conductive layer 120 is disposed in the second peripheral region A21 on the second surface 112. The non-transparent conductive layer 120 may have, for instance, a molybdenum-aluminum alloy structure, a molybdenum-aluminum-molybdenum structure, or any other metal structure. Note that a projection range of the non-transparent conductive layer 120 on the first surface 111 covers the first routings LR1-LR3. That is, in the Z direction, the non-transparent conductive layer 120 is overlapped with each of the first routings LR1-LR3. In addition, the non-transparent conductive layer 120 is located between the first routings LR1-LR3 and the display panel 200 in the Z direction.

It is worth mentioning here that since the non-transparent conductive layer 120 is made of a conductive material and relatively disposed between the first routings LR1-LR3 and the display panel 200, the non-transparent conductive layer 120 is able to block electromagnetic interference generated by the display panel 200 or other adjacent circuits, so as to isolate or reduce the noises in first routings LR1-LR3. Thereby, the controller 140 is capable of performing the touch point reporting operation according to the low-noise sensing signal and driving signal, so as to increase the stability and the touch effect of the touch panel 100 during operation.

In the embodiment depicted in FIG. 1, the substrate 110 includes a plurality of sub-touch regions SA11-SA14, SA21-SA24, and SA31-SA34 arranged in an array. The quantity of the sub-touch regions SA11-SA34 in this embodiment is merely exemplary. That is, the active region A12 (A22) of the substrate 110 is divided into a plurality of (e.g., 3×4) sub-touch regions SA11-SA34 in form of a matrix. Each of the sub-touch regions SA11-SA34 may serve as a unit touch circuit (or channel) of the touch panel 300 for performing a touch operation. Specifically, in the Y direction, the sub-touch regions SA11, SA12, SA13, and SA14 share the same sensing electrodes RX1-RX3 and the first routing LR1. Namely, the first routing LR1 is coupled to the sub-touch regions SA11, SA12, SA13, and SA14 arranged in the Y direction, where the first routing LR1 is coupled to a portion of the sensing electrodes RX1-RXn (i.e., the sensing electrodes RX1-RX3 in the above-mentioned regions SA11-SA14). The relative relationship between the first routings LR2 and LR3 and the sub-touch regions SA11-SA34 may be learned and deduced from the above description related to the first routing LR1. In this embodiment, the quantity (e.g., 3) of the first routings LR1-LR3 is equal to the quantity of all sub-touch regions SA11-SA34 in the X direction (e.g., three sub-touch regions SA14, SA24, and SA34).

In the X direction, the sub-touch regions SA11, SA21, and SA31 share the same driving electrodes TX1-TX5 and the second routing LT1. That is to, the second routing LT1 is coupled to the sub-touch regions SA11, SA21, and SA31 arranged in the X direction, where the second routing LT1 is coupled to a portion of the driving electrodes TX1-TXm (i.e., the driving electrodes TX1-TX5 in the above-mentioned regions SA11-SA31). The relative relationship between the second routings LT2-LT4 and the sub-touch regions SA11-SA34 may be learned and deduced from the above description related to the second routing LT1. In this embodiment, the quantity (e.g., 4) of the second routings LT1-LT4 is equal to the quantity of all sub-touch regions SA11-SA34 in the Y direction (e.g., four sub-touch regions SA11, SA12, SA13, and SA14).

Note that one single channel (e.g., the sub-touch region SA11) is a combination of the sensing electrodes RX1-RX3 and the driving electrodes TX1-TX5, whereby the resolution of the touch panel 100 may be increased. In addition, since the sensing electrodes RX1-RXn are not serially connected, and the driving electrodes TX1-TXm are not serially connected, these channels (i.e., the sub-touch regions SA11-SA34) may be operated independently from each other.

Figure 2B:
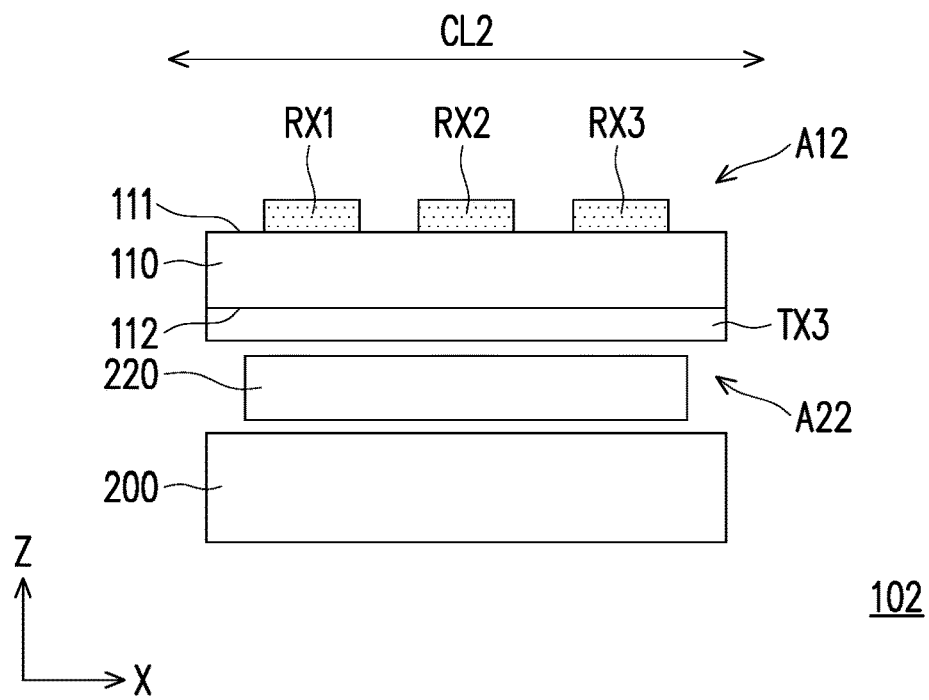
FIG. 2B is a schematic partial cross-sectional view illustrating the electronic device according to the embodiment depicted in FIG. 1.

FIG. 2B is a schematic partial top view illustrating the electronic device according to the embodiment depicted in FIG. 1. With reference to FIG. 1 and FIG. 2B, FIG. 2B exemplarily illustrates a partial structure 102 of the electronic device 10 taken along a line segment CL2 as the cross-sectional line in the active region A12 (A22) (i.e., the cross-sectional structure of the sub-touch region SA11). In this embodiment, the substrate 110 may be, for instance, a glass substrate.

In this embodiment, in the Z direction, the projection range of the driving electrode TX3 on the first surface 111 covers a portion of each of the sensing electrodes RX1-RX3, respectively. Namely, the driving electrode TX3 is overlapped with one portion of the respective sensing electrodes RX1-RX3. In addition, the driving electrode TX3 is located between the sensing electrodes RX1-RX3 and the display panel 200 in the Z direction. The relative structures of other driving electrodes TX1-TX2 and TX4-TXm and the sensing electrodes RX1-RXn may be learned and deduced from the description related to the driving electrode TX3.

In this embodiment, as shown in FIG. 2A and FIG. 2B, the non-transparent conductive layer 120 and the driving electrode TX3 are respectively disposed in different regions A21 and A22 on the second surface 112. That is, the non-transparent conductive layer 120 and the driving electrodes TX1-TXm bits are located on the same plane (i.e., in the same metal layer).

Figure 2C:
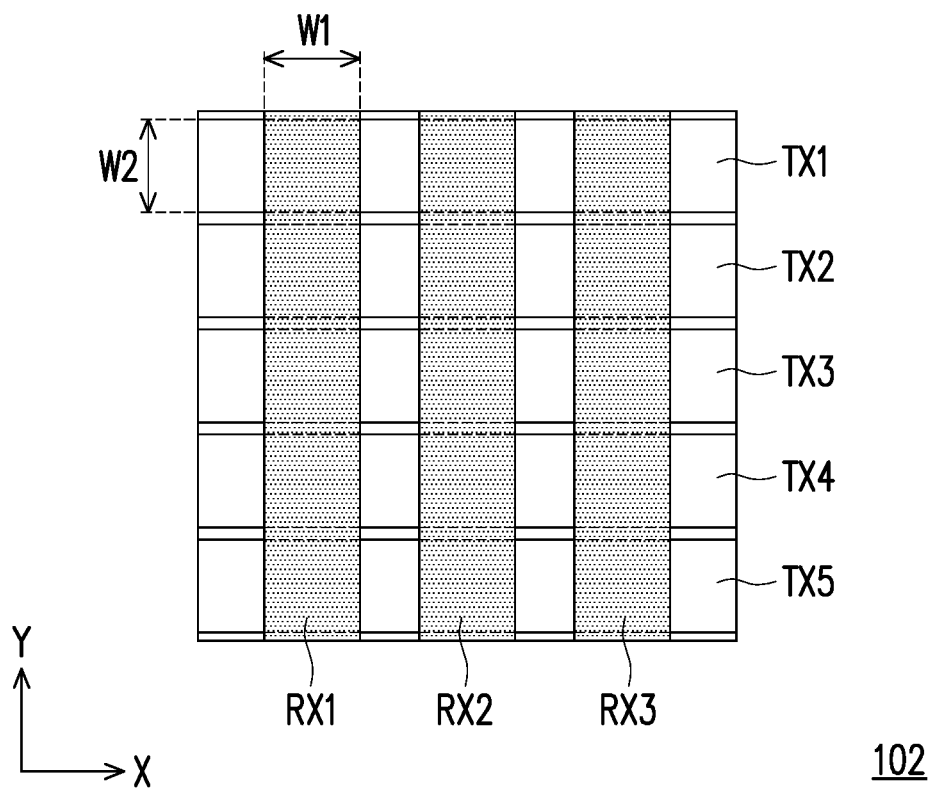
FIG. 2C is a schematic partial top view illustrating the electronic device according to the embodiment depicted in FIG. 1.

FIG. 2C is a schematic partial top view illustrating the electronic device according to the embodiment depicted in FIG. 1. With reference to FIG. 1 and FIG. 2C, FIG. 2C exemplarily illustrates a partial structure 102 of the electronic device 10 in the active region A12 (A22).

In this embodiment, on the X-Y plane, the sensing electrode RX1 has a first width W1 in the X direction, and the driving electrode TX1 has a second width W2 in the Y direction. The explanations of the sensing electrodes RX2-RXn and the driving electrodes TX2-TXm may be learned and deduced from the description related to the sensing electrode RX1 and the driving electrode TX1, respectively.

Note that the first width W1 is equal to the second width W2. The term "equal to" provided above may refer to being completely identical or equal within a measurement error range of the electrodes. Since each of the sensing electrodes RX1-RXn and each of the driving electrodes TX1-TXm have substantially the same width W1 (or W2), a distance between any touch point and each of the sensing electrodes RX1-RXn is substantially the same, whereby the electrodes RX1-RXn and TX1-TXm may respectively obtain signals having approximately the same intensity.

That is, when touch operations are performed by a finger or a stylus at different locations, the intensity of the signals obtained by the electrodes RX1-RXn and TX1-TXm at these locations does not change drastically. As such, the touch panel 100 is able to reduce the intensity variation between the signals obtained at different locations, so as to improve the stability of these signals and linearity of drawn oblique lines when the finger or the stylus moves on the touch panel 100.

Figure 2D:
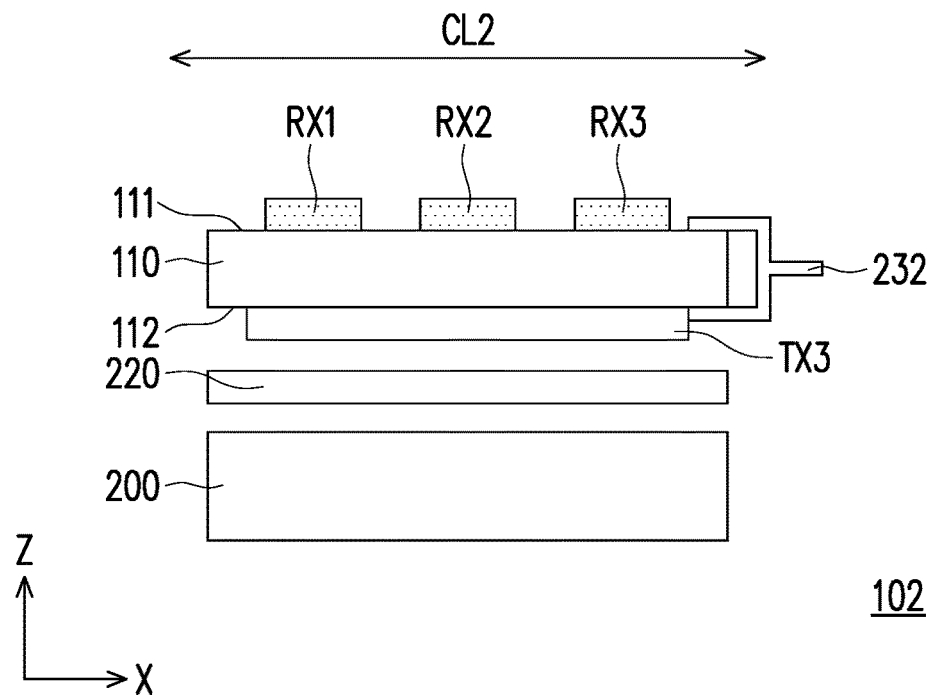
FIG. 2D is a schematic partial cross-sectional view illustrating the electronic device according to another embodiment depicted in FIG. 1.

FIG. 2D is a schematic partial cross-sectional view illustrating the electronic device according to another embodiment depicted in FIG. 1. FIG. 2D illustrates alternative embodiment depicted in FIG. 2B. The elements included in the partial structure 102 may be learned and deduced from the description related to the partial structure 102 shown in FIG. 2B and analogized.

In this embodiment, the substrate 110 may be, for instance, single layer of a plastic substrate such as polyethylene terephthalate (PET). With reference to FIG. 2D, two surface 111 and 112 of the PET layer 110 are respectively coated with the sensing electrodes RX1-RX3 and the driving electrode TX3. The substrate 110 further includes a second connector 232. The second connector 232 clamps the surfaces 111 and 112 to connect the conducting elements arranged on the substrate 110 (e.g., electrodes RX1-RX3 and TX3) to the controller 140 in FIG. 1.

Figure 2E:
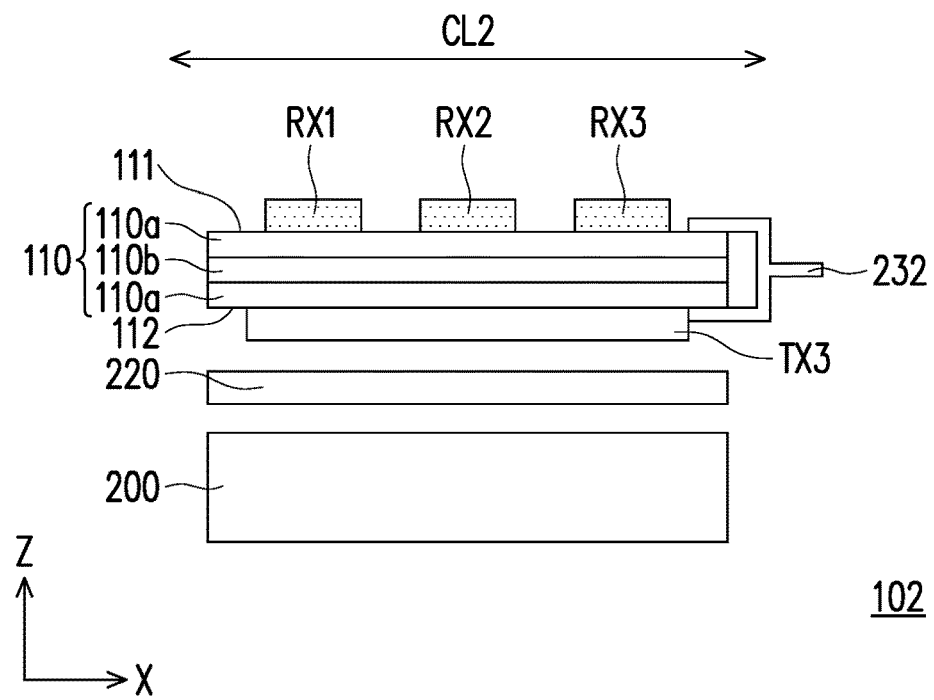
FIG. 2E is a schematic partial cross-sectional view illustrating the electronic device according to another embodiment depicted in FIG. 1.

FIG. 2E is a schematic partial cross-sectional view illustrating the electronic device according to another embodiment depicted in FIG. 1. FIG. 2E illustrates alternative embodiment depicted in FIG. 2D. The elements included in the partial structure 102 may be learned and deduced from the description related to the partial structure 102 shown in FIG. 2D and analogized.

In this embodiment, the substrate 110 may be, for instance, double layers of PET. With reference to FIG. 2E, the top PET layer 110a is coated with the sensing electrodes RX1-RX3. The bottom PET layer 110a is coated with the driving electrode TX3. These PET layers 110a are bonded by an adhesive layer 110b. The adhesive layer 110b may be, for instance, single layer of transparent adhesive such as optical clear adhesive (OCA). Alternatively stated, the substrate 110 includes two PET layers 110a and one adhesive layer 110b arranged between thereof.

Figure 3:
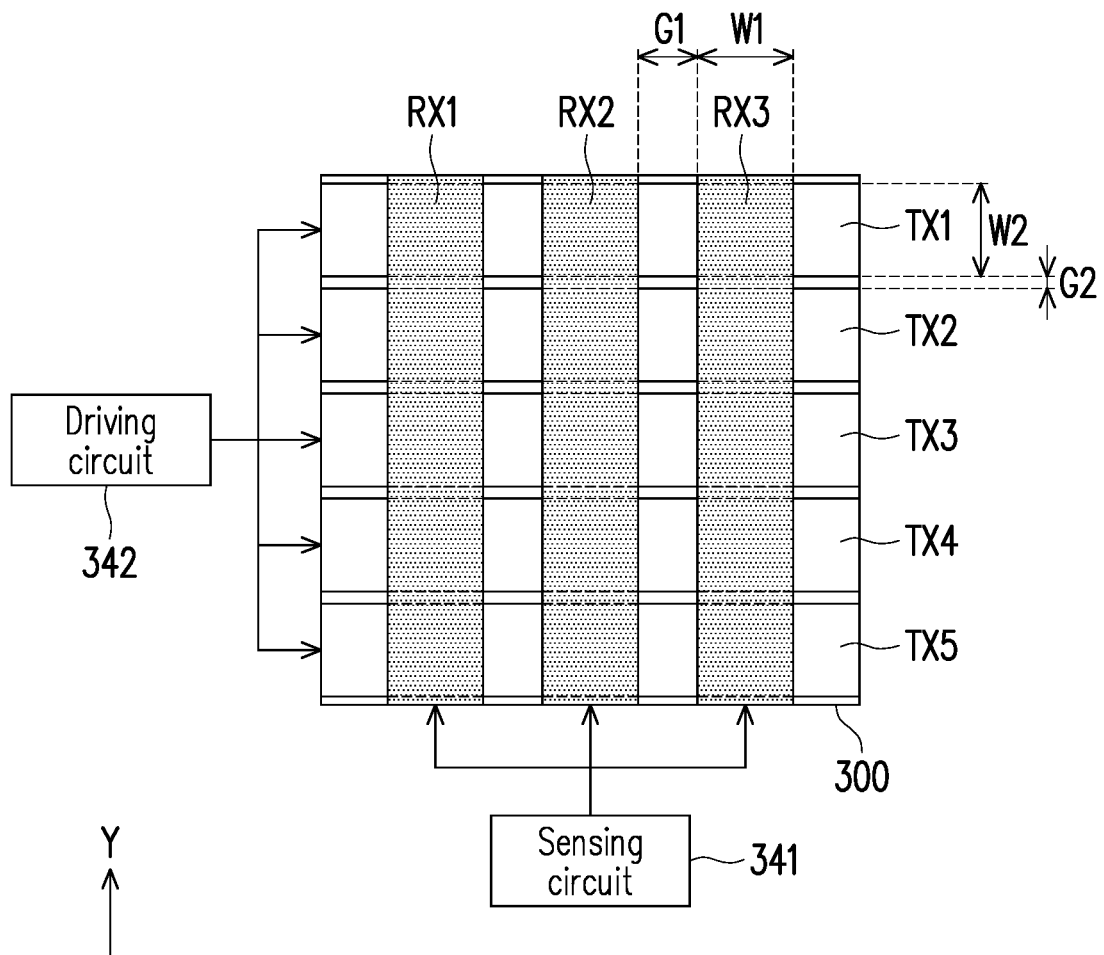
FIG. 3 is a schematic view illustrating an electronic device according to another embodiment of the disclosure.

FIG. 3 is a schematic view illustrating an electronic device according to another embodiment of the disclosure. With reference to FIG. 3, an electronic device 30 includes a touch panel 300, a sensing circuit 341, and a driving circuit 342. The sensing circuit 341 and the driving circuit 342 are coupled to the touch panel 300, respectively. The touch panel 300 includes a substrate (not shown), a plurality of sensing electrodes RX1-RX3, a plurality of driving electrodes TX1-TX5, a plurality of first routings (not shown), a plurality of second routings (not shown), and a non-transparent conductive layer (not shown). The respective quantities of the electrodes RX1-RX3 and TX1-TX5 in this embodiment are merely exemplary. The touch panel 300 and elements included in the touch panel 300 may be learned and deduced from the description related to the touch panel 100.

In this embodiment, on the X-Y plane, there exists a first pitch G1 in the X direction between any two adjacent sensing electrodes (e.g., RX2 and RX3). That is, in the X direction, the sensing electrodes RX1-RX3 are sequentially spaced from each other by the same first pitch G1. In addition, each sensing electrode (such as RX3) has a first width W1 in the X direction. In this embodiment, the first pitch G1 is smaller than the first width W1.

In this embodiment, on the X-Y plane, there exists a second pitch G2 in the Y direction between any two adjacent driving electrodes (e.g., TX1 and TX2). That is, in the Y direction, the driving electrodes TX1-TX5 are sequentially spaced from each other by the same second pitch G2. In addition, each driving electrode (such as TX1) has a second width W2 in the Y direction. In this embodiment, the second pitch G2 is smaller than the second width W2.

In this embodiment, the first pitch G1 is greater than the second pitch G2. The pitch G2 may be within a range of 15 micrometers ($\mu$m) to 30 $\mu$m, for instance. In addition, the first width W1 is substantially equal to the second width W2. Namely, on the X-Y plane, the sensing electrodes RX1-RX3 and the driving electrodes TX1-TX5 are arranged in different densities. In this embodiment, the quantity of the sensing electrodes RX1-RX3 is smaller than the quantity of the driving electrodes TX1-TX5. In some embodiments, the respective quantities of the sensing electrode RX1-RX3 and the driving electrode TX1-TX5 are determined according to the dimension of the active region of the touch panel 300, e.g., the active region A12 (A22) in FIG. 1.

According to this embodiment, the sensing circuit 341 is coupled to the sensing electrodes RX1-RX3 through the first routings, respectively. The sensing circuit 341 outputs a plurality of control signals to the sensing electrodes RX1-RX3. The sensing circuit 341 receives and processes a plurality of sensing signals obtained by sensing electrodes RX1-RX3. In this embodiment, the driving circuit 342 is coupled to the driving electrodes TX1-TX5 through the second routings, respectively. The driving circuit 342 outputs a plurality of control signals to the driving electrodes TX1-TX5. The driving circuit 342 receives and processes a plurality of driving signals obtained by driving electrodes TX1-TX5.

In this embodiment, the sensing circuit 341 and the driving circuit 342 are disposed in different chips. In some embodiments, the sensing circuit 341 and the driving circuit 342 are integrated into the same chip (e.g., the controller 140 in FIG. 1).

Figure 4:
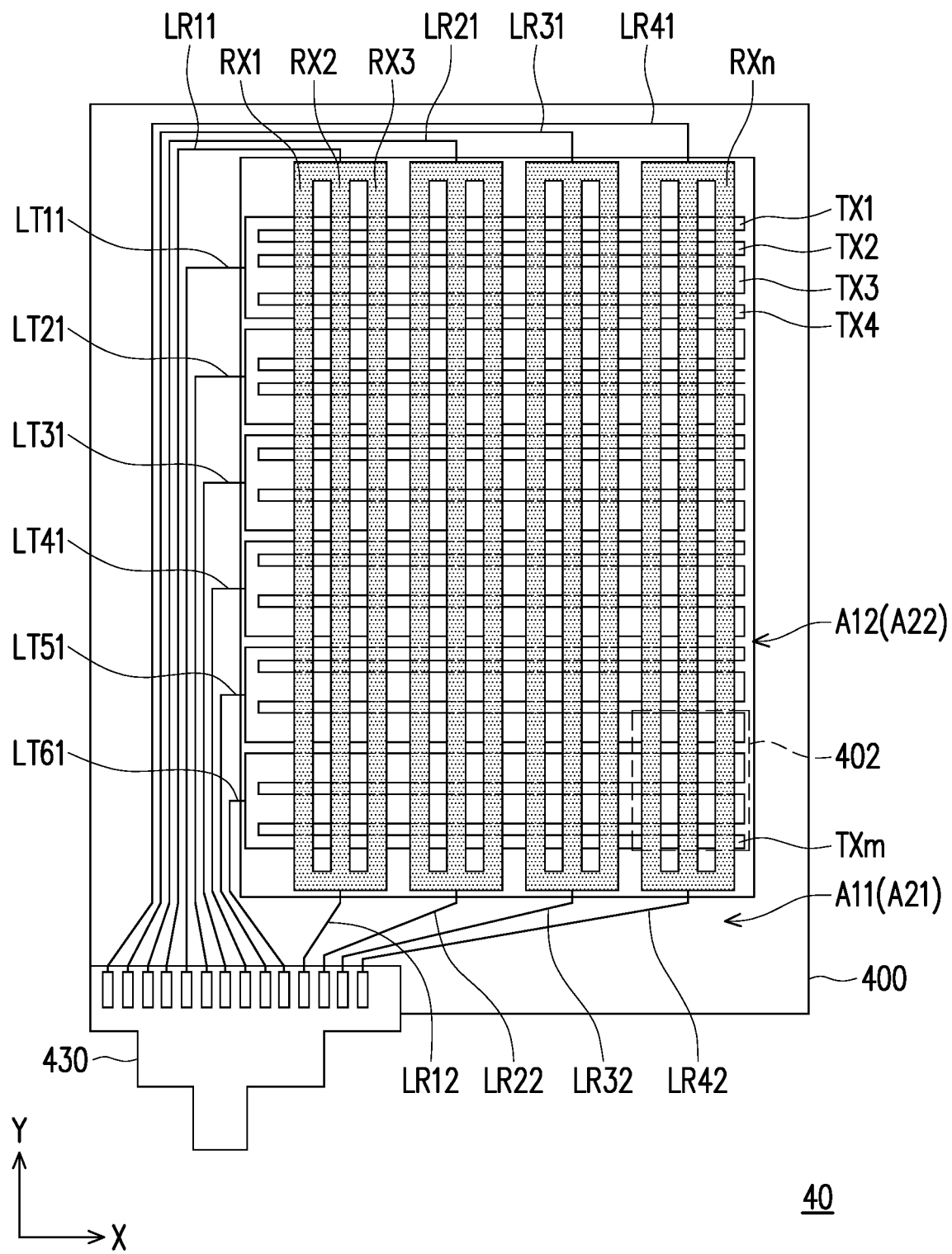
FIG. 4 is a schematic view illustrating an electronic device according to another embodiment of the disclosure.

FIG. 4 is a schematic view illustrating an electronic device according to another embodiment of the disclosure. With reference to FIG. 4, an electronic device 40 includes a touch panel 400 and a display panel (not shown). The touch panel 400 includes a substrate (not shown), a plurality of sensing electrodes RX1-RXn, a plurality of driving electrodes TX1-TXm, a plurality of first routings LR11-LR41 and LR12-LR42, a plurality of second routings LT11-LT6, a non-transparent conductive layer (not shown), a connector 430, and a controller (not shown). The respective quantities of the sensing electrodes RX1-RXn, the driving electrodes TX1-TXm, the first routings LR11-LR41, LR12-LR42, and the second routings LT1-LT6 in this embodiment are merely exemplary. The touch panel 400 and elements included in the touch panel 400 may be learned and deduced from the description related to the touch panel 100 and analogized.

In this embodiment, one portion of the first routings LR11-LR42 (e.g., the first routings LR11, LR21, LR31, and LR41) and the other portion (e.g., the first routings LR12, LR22, LR32, and LR42) are respectively coupled to a plurality of initial ends and a plurality of last ends of the sensing electrodes RX1-RXn. The aforementioned initial ends and last ends may be, for instance, opposite to each other in the Y direction. That is, in the Y direction, the initial ends and the last end on both sides of the sensing electrodes RX1-RX3 in the peripheral region A11 (A21) are respectively connected to the first routings LR11 and LR12 in a lap joint manner. The routings LR11 and LR12 are further concentrated to be connected to the connector 430 in a lap-joint manner. Other relative relationships between the first routings LR21-LR42 and the sensing electrodes RX1-RXn may be learned and deduced from the above-mentioned description related to the first routings LR11 and LR12.

Since the corresponding to the sensing electrodes RX1-RX3 (e.g., each of the sub-touch regions SA11-SA14 in FIG. 1) may be reduced. Thereby, through the bilateral routing design of the sensing electrodes RX1-RXn, the impedance of each channel may be reduced, so as to mitigate a resistance capacitance (RC) loading when the touch panel 400 is being operated. In some embodiments, one portion of the second routings (e.g., the second routings LT11-LT61 shown in FIG. 4) and the other portion (not shown) are respectively coupled to a plurality of initial ends and a plurality of last ends of the driving electrodes TX1-TXm. The initial ends and the last ends may be, for instance, opposite to each other in the X direction. That is, in the X direction, the initial ends and the last ends on both sides of the driving electrodes TX1-TX4 in the peripheral region A11 (A21) are respectively connected to the second routing LT11 and another second routing (not shown) in a lap-joint manner. The aforementioned second routing LT11 is further concentrated to be connected to the connector 430 in a lap-joint manner. The relative relationship between the second routings LT11-LT61 and the driving electrodes TX1-TXm may be learned and deduced from the above-mentioned description related to the second routing LT11.

Since the second routing LT11 and another second routing that is not shown in the drawings are connected in parallel to the driving electrodes TX1-TX4, the impedance of the channels corresponding to the driving electrodes TX1-TX4 (e.g., each of the sub-touch regions SA11-SA31) may be reduced, so as to mitigate the RC loading when the touch panel 400 is being operated On the other hand, during an assembly process of the touch panel 400, if any of the sensing electrodes RX1-RXn and/or any of the driving electrodes TX1-TXm is scratched, other electrodes RX1-RXn and/or TX1-TXm connected in parallel through allow the touch panel 400 to operate normally, thereby improving the stability of the electronic device 40.

In this embodiment, on the X-Y plane, the sensing electrodes RX1-RXn have the same width (not shown) in the X direction. On the X-Y plane, the driving electrodes TX1-TXm have different widths (not shown) in the Y direction. The width of the sensing electrodes RX1-RXn is greater than or (approximately) equal to a plurality of widths of the driving electrodes TX1-TXm.

Figure 5A:
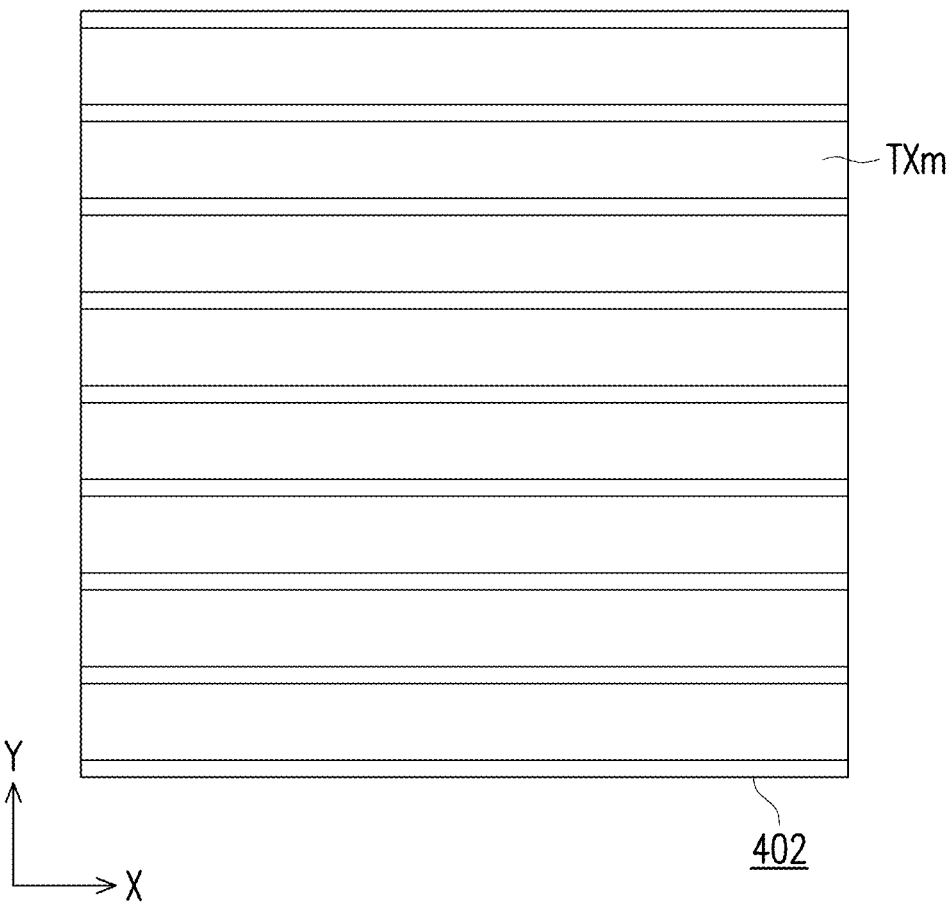
FIG. 5A and FIG. 5B are schematic partial cross-sectional views illustrating the electronic device according to the embodiment depicted in FIG. 4.
Figure 5B:
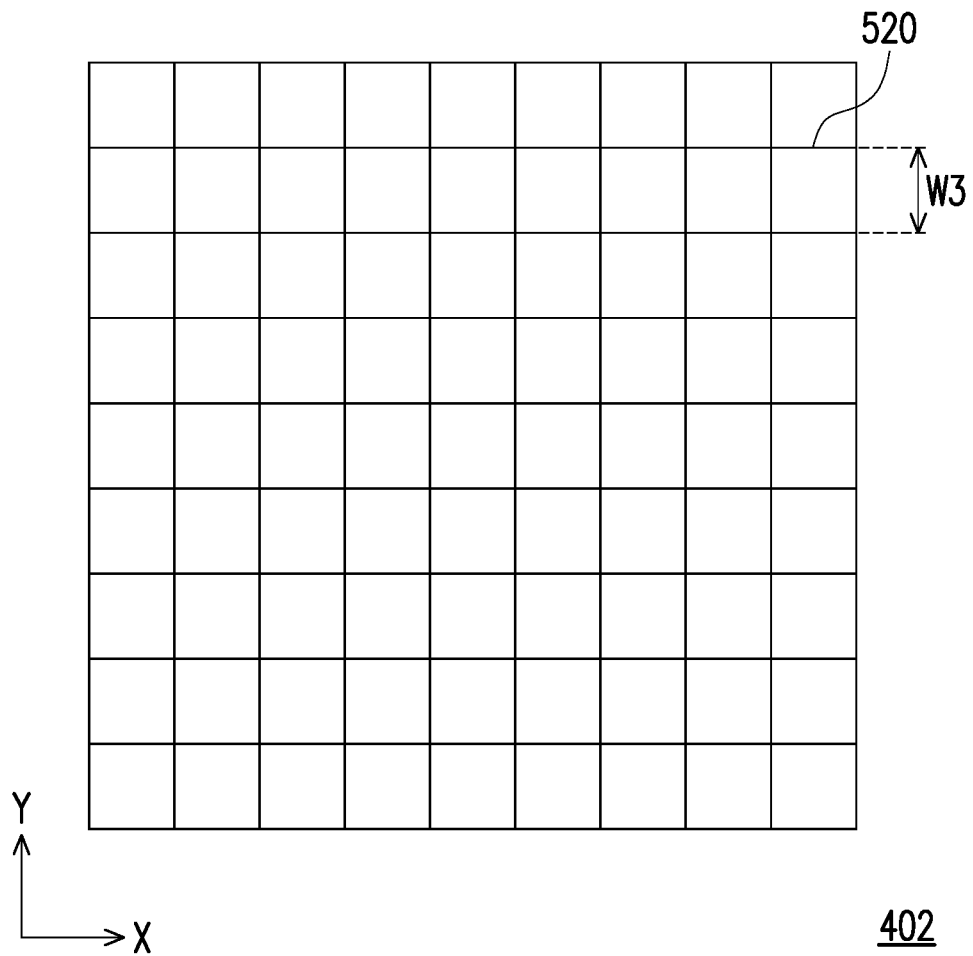

FIG. 5A and FIG. 5B are schematic partial cross-sectional views illustrating the electronic device according to the embodiment depicted in FIG. 4. With reference to FIG. 4 to FIG. 5B, FIG. 5A and FIG. 2B respectively exemplarily illustrate a partial structure 402 of the electronic device 40 in different metal layers (or cross-sectional layers) in the active region A12 (A22).

The embodiment depicted in FIG. 5A exemplarily explains the partial structure 402 of the first layer disposed on the second surface of the substrate 400. The embodiment depicted in FIG. 5B exemplarily explains the partial structure 402 of the second layer disposed on the second surface of the substrate 400. The aforementioned first layer and second layer may be different metal layers (or cross-sectional layers) that are adjacent to each other in the Z direction. That is, in the Z direction, the partial structure 402 shown in FIG. 5A and the partial structure 402 shown in FIG. 5B are overlapped with each other.

In this embodiment, the touch panel 400 further includes a non-transparent conductive layer 520 disposed in the active region A12 (A22). As shown in FIG. 5B, the non-transparent conductive layer 520 is disposed in the second active region A22 on the second surface. The non-transparent conductive layer 520 may have, for instance, a molybdenum-aluminum alloy structure, a molybdenum-aluminum-molybdenum structure, or any other metal structure. Note that the non-transparent conductive layer 520 is patterned to form a grid structure or a wave-shaped structure. In consideration of human eye visual effects, a line width of the non-transparent conductive layer 520 may be within a range of 1.5 μm to 3 μm, and a pitch W3 of the non-transparent conductive layer 520 in the X direction or the Y direction may be within a range of 200 μm to 1500 μm, for instance.

In this embodiment, as shown in the X-Y plane of FIG. 5A and FIG. 5B, a plurality of driving electrodes TXm and the non-transparent conductive layer 520 are overlapped. That is, a projection range of the non-transparent conductive layer 520 on the second surface covers the driving electrodes TXm. Since the non-transparent conductive layer 520 and the driving electrodes TXm are overlapped in the Z direction and are coupled to each other, the impedance of the touch panel 400 may be reduced.

To sum up, in the electronic device provided in one or more embodiments of the disclosure, the non-transparent conductive layer is disposed on the side opposite to the routings coupled to the sensing electrodes, and the non-transparent conductive layer may block the electromagnetic interference resulting from the display panel on the routings, so as to reduce noises and improve the stability of the touch panel in operation. In some embodiments, the sensing electrodes and the driving electrodes may constitute one single sub-touch region (i.e., channel), and the channel may operate independently and improve the resolution of the touch panel. In some embodiments, since the sensing electrodes and the driving electrodes have the same width, the intensity variation between the signals at different locations may be reduced, so as to improve the stability of the touch panel in operation. In some embodiments, the two ends of the sensing electrodes and/or the driving electrodes are respectively connected to the routings in a lap-joint manner, so as to reduce the impedance of each channel and mitigate the RC loading during the operation of the touch panel.

It will be apparent to those skilled in the art that various modifications and variations may be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An electronic device, comprising:
a touch panel, comprising:
a substrate;
a plurality of sensing electrodes, disposed in a first active region on a first surface of the substrate;
a plurality of driving electrodes, disposed in a second active region on a second surface of the substrate, wherein the first surface is opposite to the second surface;
a plurality of first routings, coupled to the sensing electrodes and disposed in a first peripheral region on the first surface;
a plurality of second routings, coupled to the driving electrodes and disposed in a second peripheral region on the second surface; and
a non-transparent conductive layer, disposed in the second peripheral region on the second surface, wherein a projection range of the non-transparent conductive layer in the first surface covers the first routings,
wherein one portion of the second routings and the other portion of the second routings are respectively coupled to a plurality of initial ends and a plurality of last ends of the driving electrodes, and the initial ends and the last ends are opposite to each other.

2. The electronic device according to claim 1, wherein a projection range of the first routings on the second surface does not overlap the second routings.

3. The electronic device according to claim 1, wherein a first width of each of the sensing electrodes is equal to a second width of each of the driving electrodes.

4. The electronic device according to claim 1, wherein a first pitch between any two adjacent sensing electrodes of the sensing electrodes is smaller than a first width of each of the sensing electrodes.

5. The electronic device according to claim 1, wherein a second pitch between any two adjacent driving electrodes of the driving electrodes is smaller than a second width of each of the driving electrodes.

6. The electronic device according to claim 1, wherein a first pitch between any two adjacent sensing electrodes of the sensing electrodes is larger than a second pitch between any two adjacent driving electrodes of the driving electrodes.

7. The electronic device according to claim 1, wherein a quantity of the sensing electrodes is less than a quantity of the driving electrodes.

8. The electronic device according to claim 1, wherein the sensing electrodes are sequentially spaced from each other by a same first pitch.

9. The electronic device according to claim 1, wherein the driving electrodes are sequentially spaced from each other by a same second pitch.

10. The electronic device according to claim 1, wherein a projection range of the driving electrodes on the first surface and the sensing electrodes are alternately arranged.

11. The electronic device according to claim 1, wherein the sensing electrodes and the driving electrodes respectively extend in different directions.

12. The electronic device according to claim 1, wherein the non-transparent conductive layer and the driving electrodes are on a same plane.

13. The electronic device according to claim 1, wherein each of the first routings is coupled to one portion of the sensing electrodes, respectively.

14. The electronic device according to claim 1, wherein each of the second routings is coupled to one portion of the driving electrodes, respectively.

15. The electronic device according to claim 1, wherein one portion of the first routings and the other portion of the first routings are respectively coupled to a plurality of initial ends and a plurality of last ends of the sensing electrodes, and the initial ends and the last ends are opposite to each other.

16. The electronic device according to claim 1, wherein the touch panel further comprises:
 a connector, disposed on the substrate and comprising a plurality of metal bonding pads, wherein the metal bonding pads are coupled to the first routings and the second routings.

17. The electronic device according to claim 1, wherein the substrate comprises a plurality of sub-touch regions arranged in an array, and a quantity of the first routings is equal to a quantity of the sub-touch regions in a first direction.

18. The electronic device according to claim 1, wherein the substrate comprises a plurality of sub-touch regions arranged in an array, and a quantity of the second routings is equal to a quantity of the sub-touch regions in a second direction.

19. The electronic device according to claim 1, further comprising:
 a display panel, disposed below the touch panel, a display surface of the display panel facing the second surface.

20. The electronic device according to claim 1, wherein the touch panel further comprises:
 a second non-transparent conductive layer, disposed in the second active region on the second surface, wherein a projection range of the second non-transparent conductive layer in the second surface covers the driving electrodes.

21. An electronic device, comprising:
a touch panel, comprising:
a substrate;
a plurality of sensing electrodes, disposed in a first active region on a first surface of the substrate;
a plurality of driving electrodes, disposed in a second active region on a second surface of the substrate, wherein the first surface is opposite to the second surface;
a plurality of first routings, coupled to the sensing electrodes and disposed in a first peripheral region on the first surface;
a plurality of second routings, coupled to the driving electrodes and disposed in a second peripheral region on the second surface; and
a non-transparent conductive layer, disposed in the second peripheral region on the second surface, wherein a projection range of the non-transparent conductive layer in the first surface covers the first routings,
wherein the substrate comprises a plurality of sub-touch regions arranged in an array, and a quantity of the first routings is equal to a quantity of the sub-touch regions in a first direction.

22. An electronic device, comprising:
a touch panel, comprising:
a substrate;
a plurality of sensing electrodes, disposed in a first active region on a first surface of the substrate;
a plurality of driving electrodes, disposed in a second active region on a second surface of the substrate, wherein the first surface is opposite to the second surface;
a plurality of first routings, coupled to the sensing electrodes and disposed in a first peripheral region on the first surface;
a plurality of second routings, coupled to the driving electrodes and disposed in a second peripheral region on the second surface;
a non-transparent conductive layer, disposed in the second peripheral region on the second surface, wherein a projection range of the non-transparent conductive layer in the first surface covers the first routings; and
a second non-transparent conductive layer, disposed in the second active region on the second surface, wherein a projection range of the second non-transparent conductive layer in the second surface covers the driving electrodes.

* * * * *